(No Model.) 2 Sheets—Sheet 1.
F. A. MILLS.
PLOW.
No. 392,216. Patented Nov. 6, 1888.
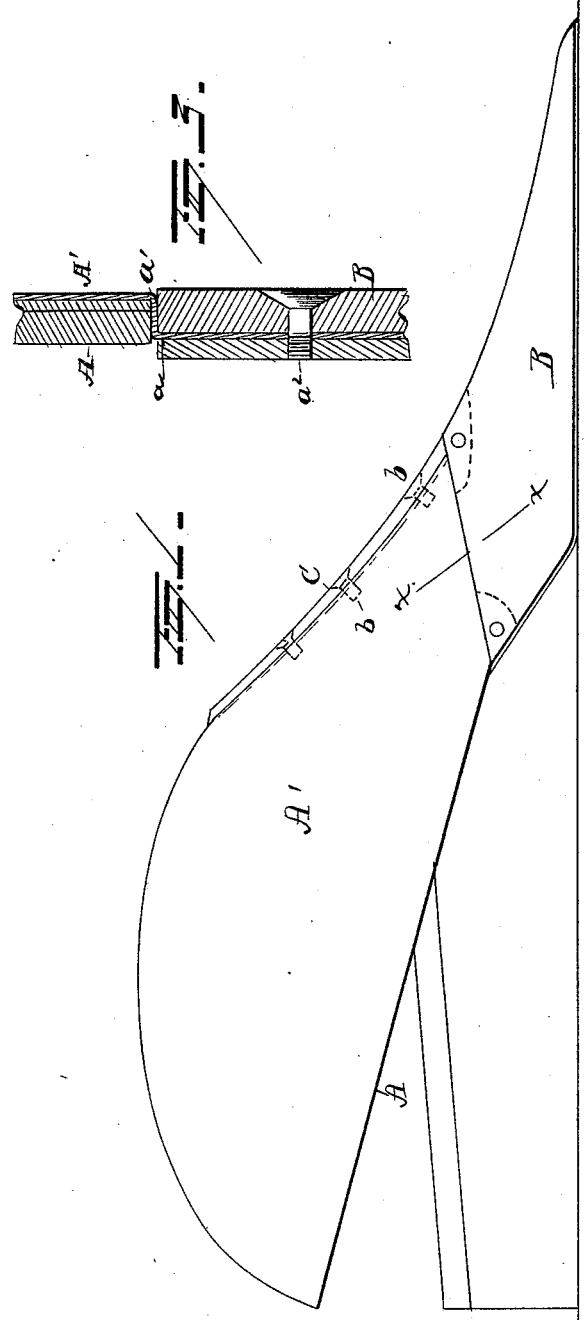
Witnesses:
C. S. Nottingham
G. F. Downing
Inventor,
Frederick A. Mills,
By his Attorneys
Leggett and Leggett.

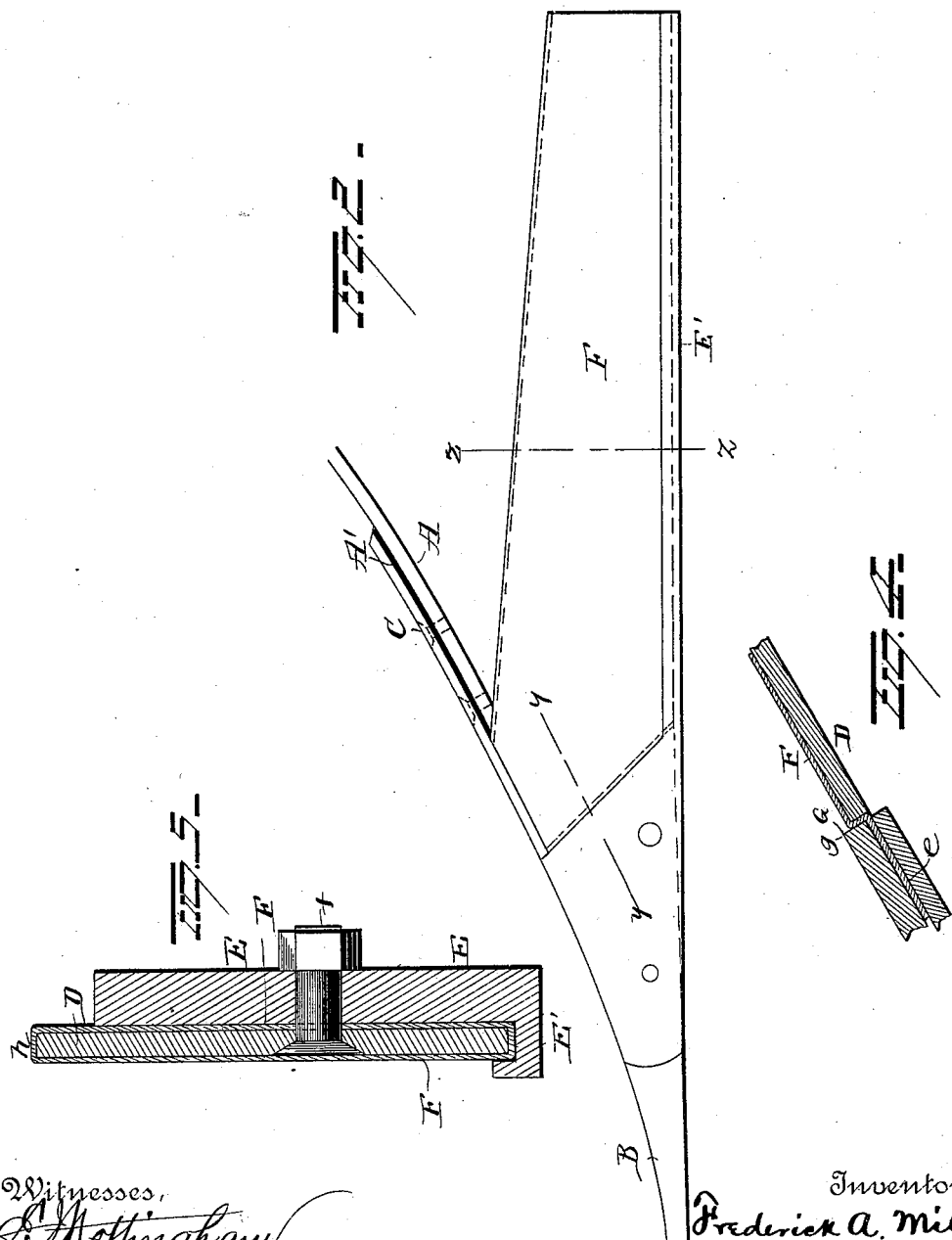

UNITED STATES PATENT OFFICE.

FREDRICK ALANSON MILLS, OF DALLAS, TEXAS, ASSIGNOR OF ONE-HALF TO MIDDLETON BROS. AND C. F. MILLS, OF SAME PLACE.

PLOW.

SPECIFICATION forming part of Letters Patent No. 392,216, dated November 6, 1888.

Application filed August 8, 1888. Serial No. 282,198. (No model.)

*To all whom it may concern:*

Be it known that I, FREDRICK ALANSON MILLS, a resident of Dallas, in the county of Dallas and State of Texas, have invented certain new and useful Improvements in Attachments for Plows and other Similar Implements; and I do hereby declare the following to be a full, clear, and exact description of the invention, such as will enable others skilled in the art to which it appertains to make and use the same.

My invention relates to an improved attachment for the mold-boards and landsides of plows, the object being to furnish a plow or similar implement with an attachable and removable covering for the landside and mold-board, which will prevent the adhesion of soil thereto.

With these objects in view my invention consists in the employment of a new material for the purpose and in the devices for its application to the portions of a plow which it is desirable to protect by such means, as will be hereinafter described, and pointed out in the claims.

In some sections of the West and South the soil consists of a stiff black loam which has a tendency to stick to a steel or iron mold-board and landside of a plow when in use, rendering the plowing operation difficult, owing to the frictional resistance of the ground.

I have found by practical experiment that an application of animal-hide divested of the hair and properly adjusted to form a wearing surface for the mold-board and landside of a plow will obviate the undue friction and adherence of the soil to these parts of the plow, and more effectually when a slight undulation is given the furrow-slice to break it up. I have therefore devised a simple and reliable method for adjustably securing in place a hide covering for the mold-board and landside of a plow, which will form a facing for these portions of the implement on the side that engages the earth when in use, as will be now explained.

Referring to the accompanying drawings, which illustrate my preferred method of attachment of the hide cover to the plow, Figure 1 is a side elevation of the mold-board and share of a plow, showing the face side of these parts and covering in place thereon. Fig. 2 is a rear elevation of the mold-board, share, and landside of a plow with the hide cover attached thereto. Fig. 3 is a cross-section of the mold board, hide cover, and plowshare, taken on line $x$ $x$, Fig. 1, showing the preferred method of securing the hide to the mold-board. Fig. 4 is a sectional view of the plowshare secured on the landside on the line $y$ $y$, Fig. 2, showing the means of attachment of the hide cover to the latter-named piece of the plow. Fig. 5 is a vertical section of the landside, taken on the line $z$ $z$, Fig. 2.

A is the mold-board of a plow, which may be of any preferred form, and B is the plowshare. On the face of the mold-board, which in use comes in contact with the furrow-slice to turn it, the hide cover A' is placed, there being interposed a padding or layer of wool, cotton, or other elastic material, which is intended to afford a slightly-yielding bed for the hide cover, which will take up any inequalities in the surface of the cover and also compensate for expansion and contraction of the same, owing to change of condition resulting from its being exposed to the elements.

In order to properly hold the hide covering upon the metal mold-board the edge of the cover A' is extended beyond the joining-edge of the mold-board with the plowshare B and made to project beneath the latter-named piece, as shown in Fig. 3, the bending of the hide cover A' at the corners $a$ $a'$ permitting such a disposition of material.

It is desirable that there be a slight projection of the edge of the plowshare above the skin cover A' at the line of junction of the mold-board and share, so as to avoid wear on the corner $a$, where the hide bends downwardly, and also to give an indulation of the furrow-slice, which will allow air to enter between the skin and the furrow-slice, thus preventing an adhesion of the earth to the skin, which ordinarily results from an air-tight contact of a furrow-slice with the mold-board of a plow.

If the skin itself is not sufficiently thick to raise the plowshare at the point of its attachment to the mold-board, a strip of any suitable material—such as hide, wood, or metal—may be introduced between the covering A' and the adjacent surface of the plowshare, which latter is secured in position to clamp the hide fast by the ordinary plow-bolts, $a^2$, that are inserted through holes made in the hide and washer-strip if the latter is introduced as stated. The hide covering A' is further secured in place by metal clamping-strips C, which are bent to hook over the edges of the mold-board and bear upon the edge of the hide, said strips being perforated, as is also the edge of the mold-board and the skin cover, to receive bolts $b$, which serve to bind the skin fast to the edge of the mold-board around its entire contour, except where it is clamped to the plowshare, as before explained.

If desired, the hide cover A' may be held in place by straps that are provided with buckles, said straps being attached to the outer edge of the covering that is folded around the edge of the mold-board, these straps being shortened by use of the buckles to draw the skin tightly upon the metal face of the mold-board in an obvious manner.

The plowshare is not shown as being covered with the hide; but it is desirable to place such a protecting device upon the outer face of the landside E. Reference to Figs. 2, 4, and 5 will indicate the means of holding the hide upon said portion of the plow.

The edge $e$ of the skin-covering F is doubled around the forward edge of the landside, as shown in Fig. 4, so as to extend and lie upon the surface of the plowshare, which is formed to receive the landside.

Upon the extended end portion, $e$, of the hide cover of the landside E a plate of steel, G, is applied, said plate having a form which corresponds to the vertical side of the plowshare on which it is affixed. This plate G is thickened at the edge $g$, where it is superimposed upon the hide cover F, and the plate is firmly secured in proper contact therewith by bolts which are inserted at proper points to effect such an adjustment.

The main portion of the hide covering of the metal landside-plate is held in place by doubling the covering F around the upper edge of the landside D, as shown in Fig. 5, the edges $h$ of said cover aligning with the lower edge of the landside, and a metal wear plate or shoe, E, has its lower bent edge, E', placed over the edges $h$ of the hide cover F, it being bolted fast to the landside, so as to bind it and the cover tightly upon the landside, the shoe E also serving to protect the lower edges of the cover F from improper wear incidental to use.

It should be mentioned that the steel plate G affords an offset at its point of bearing on the hide cover F, where the landside D and plowshare B are joined, so that a similar break in the surface of contact of the ground with the hide covering of the landside is afforded, as is provided for the mold-board previously described, and a padding of elastic material is also introduced to form a cushion between the hide and the landside plate.

If desired, there may be bolts and metal strips substituted for the shoe E to hold the hide cover F in place upon the landside-plate D; but preference is given to the shoe as being a more complete and efficient means for the purpose.

It should be understood that I do not limit myself to the use of any particular skin or hide, as that of quadrupeds, fishes, or reptiles may, if of proper thickness and strength, be employed for the covering of the parts of a plow, as hereinbefore stated.

I have described my invention as applied to plows; but it is apparent that it may be utilized to advantage in connection with other farming tools for similar uses—such as cultivators or planters; hence I do not wish to restrict its employment to plows alone; but, Having fully described my invention, what I claim as new, and desire to secure by Letters Patent, is—

1. A farming implement used to turn the earth, having a portion of its surface which receives the impact of the soil covered with skin or hide, substantially as set forth.

2. A plow having its mold-board covered with a piece of skin or hide, substantially as set forth.

3. A plow having its landside covered with skin or hide, substantially as set forth.

4. A plow having its mold-board and landside covered on their wearing-faces with skin or hide, substantially as set forth.

5. In a plow, the combination, with a mold-board and a plowshare, of a hide or skin cover and means to secure the cover on the mold-board, substantially as set forth.

6. In a plow, the combination, with a mold-board and a skin or hide covering therefor, of a yielding padding interposed between the cover and mold-board and a device to secure the covering with the interposed padding in place upon the mold-board, substantially as set forth.

7. In a plow, the combination, with a mold-board, a skin or hide covering, and means to hold the cover in place on the mold-board, of a plowshare and a landside, substantially as set forth.

8. In a plow, the combination, with a mold-board, a skin or hide covering, and means for holding the cover in place on the mold-board, of a plowshare, a landside, and a hide covering for the landside, substantially as set forth.

9. In a plow, the combination, with a mold-board, a plowshare, and a landside, of a skin or hide covering for the landside and an elastic or yielding padding interposed between the landside face and the hide covering, substantially as set forth.

10. In a plow, the combination, with a mold-board, a skin or hide cover for the mold-board, a plowshare, and means to hold the skin cover upon the mold-board and between the adjacent edges of the mold-board and plowshare, of a landside, a skin cover for the landside, a yielding padding interposed between the landside-plate and its hide cover, a shoe or wear plate, and a clamping-plate secured to the plowshare and bearing on the hide cover of the landside, substantially as set forth.

In testimony whereof I have signed this specification in the presence of two subscribing witnesses.

FREDRICK ALANSON MILLS.

Witnesses:
J. P. SLOCUM,
J. F. DAVAULT.